US008266598B2

(12) United States Patent
Gulwani et al.

(10) Patent No.: US 8,266,598 B2
(45) Date of Patent: Sep. 11, 2012

(54) BOUNDING RESOURCE CONSUMPTION USING ABSTRACT INTERPRETATION

(75) Inventors: Sumit Gulwani, Redmond, WA (US); Krishna Kumar Mehra, Bangalore (IN); Trishul A Chilimbi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 12/115,435

(22) Filed: May 5, 2008

(65) Prior Publication Data
US 2009/0276763 A1    Nov. 5, 2009

(51) Int. Cl.
*G06F 9/44*    (2006.01)
(52) U.S. Cl. ......................................................... 717/130
(58) Field of Classification Search .......................... None
See application file for complete search history.

(56) References Cited

U.S. PATENT DOCUMENTS

| | | | |
|---|---|---|---|
| 5,649,113 A | 7/1997 | Zhu et al. | |
| 5,828,883 A * | 10/1998 | Hall | 717/133 |
| 6,343,375 B1 | 1/2002 | Gupta et al. | |
| 6,539,541 B1 * | 3/2003 | Geva | 717/150 |
| 6,681,385 B1 * | 1/2004 | Steensgaard et al. | 717/133 |
| 6,832,370 B1 * | 12/2004 | Srinivasan et al. | 717/161 |
| 6,848,099 B2 | 1/2005 | Harrison, III et al. | |
| 6,980,511 B1 | 12/2005 | Li et al. | |
| 6,988,266 B2 | 1/2006 | Lam et al. | |
| 7,039,919 B1 | 5/2006 | Hunt | |
| 7,092,395 B2 | 8/2006 | He et al. | |
| 7,574,695 B2 * | 8/2009 | Chander et al. | 717/126 |
| 7,730,455 B2 * | 6/2010 | Chander et al. | 717/126 |
| 2002/0010911 A1 * | 1/2002 | Cheng et al. | 717/4 |
| 2004/0148150 A1 * | 7/2004 | Ashar et al. | 703/14 |
| 2005/0216793 A1 | 9/2005 | Entin et al. | |
| 2005/0229044 A1 | 10/2005 | Ball | |
| 2006/0048122 A1 * | 3/2006 | Barton et al. | 717/160 |
| 2006/0075420 A1 | 4/2006 | Ludvig et al. | |
| 2006/0168480 A1 | 7/2006 | Chandler et al. | |
| 2006/0236305 A1 | 10/2006 | Chang et al. | |

(Continued)

FOREIGN PATENT DOCUMENTS

WO    WO2004095367 A2    11/2004

OTHER PUBLICATIONS

Gustafasson et al., "Automatic Derivation of Loop Bounds and Infeasible Paths for WCET Analysis using Abstract Execution." IEEE 2006.*

(Continued)

*Primary Examiner* — Wei Zhen
*Assistant Examiner* — Adam R. Banes
(74) *Attorney, Agent, or Firm* — Lee & Hayes, PLLC

(57) ABSTRACT

Bounding resource consumption of code using abstract interpretation includes a static analysis to estimate a code's resource consumption in terms of units of resources utilized at any point during execution, expressed as a function of its scalar inputs. An instrumentation mechanism and an abstract interpretation mechanism are employed to compute bounds on the code resource consumption. The instrumentation mechanism includes incorporating one or more counter variables in the source code to count the number of loop iterations and recursive procedure call invocations. The abstract interpretation mechanism includes computing invariants on the instrumented counter variables and scalar program variables to obtain bounds on the number of loop iterations and recursive procedure call invocations, which are then composed together to obtain resource bounds for the entire program.

20 Claims, 10 Drawing Sheets

U.S. PATENT DOCUMENTS

| | | |
|---|---|---|
| 2007/0136285 A1 | 6/2007 | Cormode et al. |
| 2008/0016497 A1 | 1/2008 | Wang et al. |
| 2008/0172653 A1* | 7/2008 | Sankaranarayanan et al. .................... 717/126 |

OTHER PUBLICATIONS

Ermedahl, et al., "Loop Bound Analysis based on a Combination of Program Slicing, Abstract Interpretation, and Invariant Analysis", retrieved on Aug. 1, 2008 at <<http://www.irit.fr/wcet2007/finalpapers/ermedahl.pdf>>, Malardalen University.

Gulwani et al., "Bounding Resource Consumption Using Abstract Interpretation," presented May 10, 2007 at OSQ Retreat organized by University of California Berkeley, 5 pages.

Gulwani, et al., "Program Analysis as Constraint Solving", , retrieved on Aug. 1, 2008 at <<http://delivery.acm.org/10.1145/1380000/1375616/p281-gulwani.pdf?key1=1375616&key2=6715757121&coll=ACM&dl=ACM&CFID=80447904&CFTOKEN=51925821>>, PLDI '08, ACM, 2008, Jun. 7-13, 2008, pp. 281-292.

Heckman, et al., "Worst-Case Execution Time Prediction by Static Program Analysis", retrieved on Aug. 1, 2008 at <<http://www.absint.com/aiT_WCET.pdf>>, Abslnt Angewandte Informatik.

Horvitz, et al., "Bounded Conditioning: Flexible Inference for Decisions under Scarce Resources", available at least as early as Aug. 8, 2007, at <<ftp://ftp.research.microsoft.com/pub/ejh/boundedc.pdf>>, pp. 12.

Larchey, "Bounding resource consumption with G"odel-Dummett logics", available at least as early as Aug. 8, 2007, at <<http://www.loria.fr/larchey/papers/LPAR2005.pdf>>, pp. 15.

Navas, et al., "Resource Bounds Analysis", available at least as early as Aug. 8, 2007, at <<http://www.cs.unm.edu/treport/tr/07-01/Resource-Bounds-Analysis.pdf>>, pp. 19.

Regehr, et al., "Eliminating stack overflow by abstract interpretation", at <<http://www.cs.ucla.edu/palsberg/course/cs239/S04/papers/RegehrReidWebb03.pdf>>, Springer-Verlag, 2003, pp. 306-322.

Venet, "Nonuniform Alias Analysis of Recursive Data Structures and Arrays", retrieved on Aug. 1, 2008 at <<http://citeseer.ist.psu.edu/cache/papers/cs/31908/http:zSzzSzase.arc.nasa.govzSzdocszSz..zSzpeoplezSzvenetzSzsas02.pdf/venet02nonuniform.pdf>>, LIX, Ecole Polytechnique.

Gustafsson et al., "Automatic Derivation of Loop Bounds and Infeasible Paths for WCET Analysis using Abstract Execution," Proceedings of the 27th IEEE International Real-Time Systems Symposium (RTSS'06), IEEE 2006, 10 pages.

Office Action for U.S. Appl. No. 12/247,034, mailed on Feb. 13, 2012, Sumit Gulwani, "Calculating Resource Bounds of Programs Manipulating Recursive Data Structures and Collections," 9 pages.

\* cited by examiner

BOUNDING RESOURCE CONSUMPTION USING ABSTRACT INTERPRETATION

BACKGROUND

Modern software development techniques use modular design and data abstraction to increase a programmer's productivity by increased source code reuse. However, these techniques can also create additional performance problems such as those caused by incorrect estimation of the computational complexity of executable code. Computational complexity is an estimate of the total number of resources consumed by the code during execution. The resources can include timing resources, memory usage, number of files opened, number of threads created, etc.

Software performance testing attempts to address these issues by analyzing the computational complexity of the code using various test inputs. However, the code is generally tested using a small subset of inputs, which may not be sufficient to manifest the performance problems in the source code. Consequently, many performance problems show up very late in the software development process when it is hard to redesign the system to correct them.

SUMMARY

This summary introduces simplified concepts of bounding resource consumption for code using abstract interpretation, which is further described below in the Detailed Description. This summary is not intended to identify essential features of the claimed subject matter, nor is it intended for use in determining the scope of the claimed subject matter.

Implementations for bounding resource consumption of executable code using abstract interpretation are described. In one implementation, one or more counter variables are placed in the code to count the number of units of resources utilized during execution of the code. Invariants for the code are then determined based on the counter variables. The system calculates respective bounds on the counter variables based on the invariants. The respective bounds are then combined based on a comparison of the respective bounds and zero to generate a resource bound for the code.

This summary is provided to introduce a selection of concepts in a simplified form to be further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
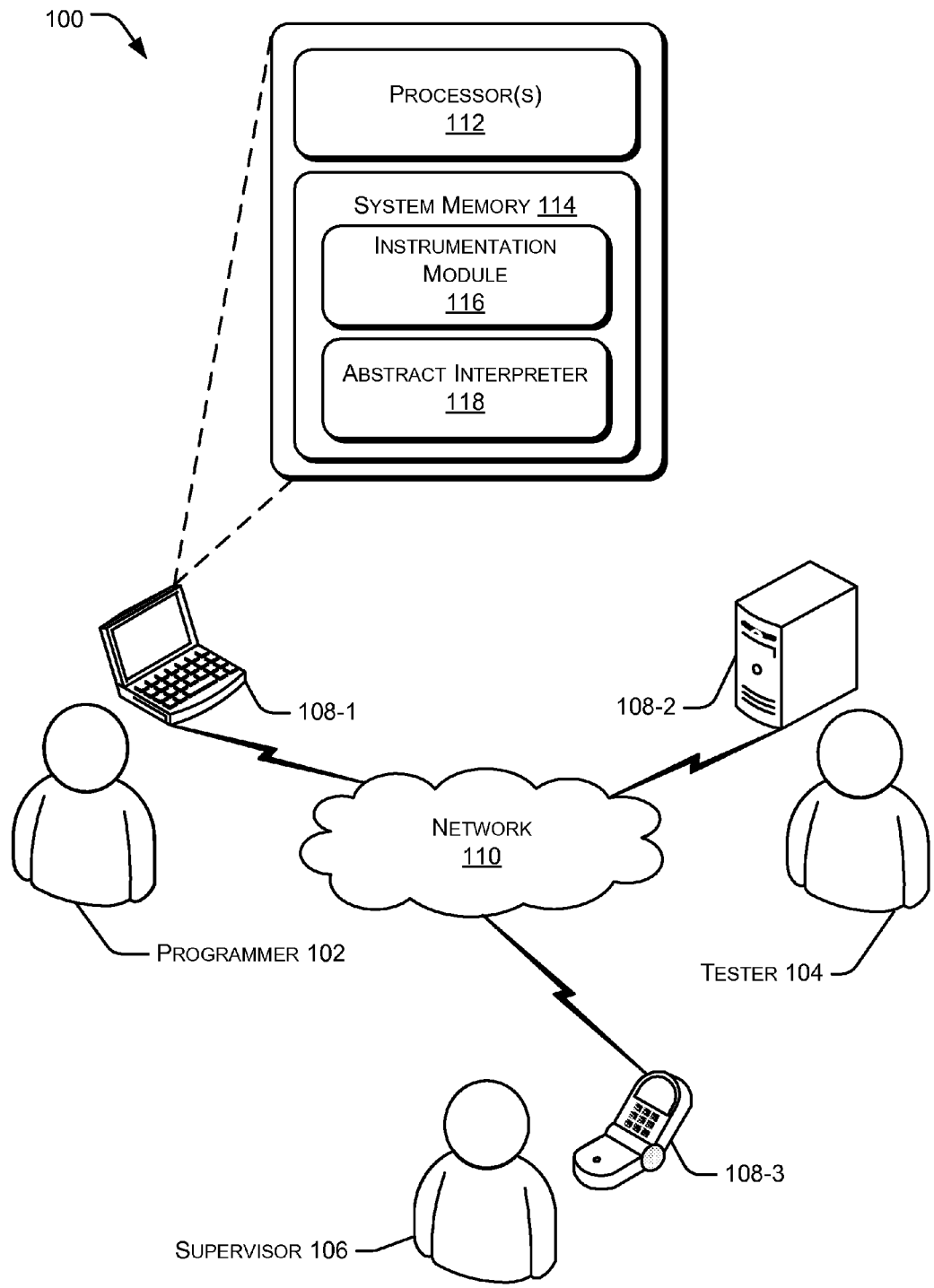
FIG. 1 illustrates an exemplary environment suitable for implementing calculation of bounds of resource consumption for code using abstract interpretation.

This disclosure describes techniques for bounding resource consumption of code using abstract interpretation. The bounds for resource consumption are expressed as a function of program inputs. In the examples described, the program inputs take scalar values.

The resource bounds can correspond to any of several kinds of resources consumed by code. For example, the resource may be the time taken by the code to execute, or the amount of memory allocated by the code, an operating system resource such as the number of file handles or locks, the available network bandwidth used, or any other resource used by the code. Knowing the resource bounds can help a developer or tester of a software application to estimate the maximum job size that the software application can handle. Knowing the maximum job size that the software application can handle may also help to configure the termination of the application smoothly, without causing it to hang or crash if the required resources are not available. The maximum job size value can also help in correctly estimating time taken to execute the software application, hardware resources required, etc.

An example of computing a resource bound is described in terms of a timing resource. A resource bound is also referred to as the computational complexity of the code. The complexity bound for each procedure called in the code is computed in terms of its formal parameters in a bottom-up order of the procedure call graph. Since the call graph can have cycles due to recursive procedures, the call graph is decomposed into a DAG of maximal strongly connected components (SCCs) for processing. The SCCs include a main procedure and one or more constituent procedures. Each non-trivial SCC represents a set of constituent recursive procedures that call each other recursively. The DAG is processed in reverse topological order, and procedure summaries for each procedure are computed. Procedure summaries for constituent recursive procedures and constituent non-recursive procedures are computed using different techniques, and are discussed separately below. Note that constituent non-recursive procedures are those that are not part of any non-trivial SCC, whereas constituent recursive procedures are those that are part of a non-trivial SCC. When the process of computing procedure summaries is completed, the procedure summary computed for the main procedure provides the complexity bound for the entire program.

The complexity of a constituent non-recursive procedure is computed by combining the computational complexity of the constituent code-fragments of the constituent non-recursive procedure in a bottom-up manner as follows:

$$\|S1;S2\|=\|S1\|+\|S2\|$$

$$\|\text{while } c \text{ do } S\|=\|S\|*\text{upper bound on loop iterations}$$

$$\|\text{if } c \text{ then } S1 \text{ else } S2\|=\text{Max}(\|S1\|,\|S2\|)$$

$$\|s\|=1$$

$$\|U:=\text{Call}(Q(V))\|=\text{Project}_{upper}(\|Q\|(V/Y), I_{call}, X)$$

Here $\|S\|$ denotes the resource bounds for constituent code-fragment S, and s denotes a single atomic statement. X denotes the set of scalar input variables of the constituent non-recursive procedure whose complexity is being computed. $\text{Project}_{upper}(e, \phi, V)$ denotes an upper bound on variable t that is implied by the formula $\exists V'$ ($t \leq e \wedge \phi$), where V' is the set of all variables that occur in e and $\phi$ except V, and t is a fresh variable. $\|Q\|$ denotes the complexity of procedure Q expressed as a function of the formal parameters Y of Q, and $I_{call}$ denotes an invariant at the call site. Observe that the resource bounds $\|S\|$ for a constituent code-fragment are expressed in terms of the upper bounds on loop iterations for loops present inside constituent code-fragment S.

The complexity of a constituent recursive procedure P is computed as follows. Let $P, P_1, \ldots, P_n$ be the procedures in the SCC corresponding to P. Let $u, u_1, \ldots u_n$ be the number of times each of these procedures is called recursively. This number is computed using methods described below. Let $<P>, <P_1>, \ldots, <P_n>$ be the complexity bounds computed using the technique for computing the complexity of a non-recursive procedure described above, after associating a unit cost with each of the recursive procedure calls. Then the complexity bound for procedure P is given by:

$$\|P\|=<P>*u+<P_1>*u_1+\ldots+<P_n>*u_n$$

The methods described above for computing bounds on any kind of resource consumed by a program may be generalized to estimate bounds on a variety of resources such as memory consumption, number of files opened, number of threads created, number of file handles or locks, amount of available network bandwidth used, and so forth. Two important generalizations that enable this estimation are the following replacements to $\|s\|$ and $\|\text{while } c \text{ do } S\|$ from the computation for the complexity of a non-recursive procedure discussed above:

- $\|s\| = n$, if s allocates n units of resources
  $= -n$, if s deallocates n units of resources

- $\|\text{while } c \text{ do } S\| = \|S\| * \text{upper bound on loop iterations, if } \|S\| \geq 0$
  $= \|S\| * \text{lower bound on loop iterations, if } \|S\| \leq 0$
  $= \text{Max}\{\|S\| * \text{upper bound}, \|S\| * \text{lower bound}\}$, otherwise.

The methods discussed above for computing the complexity of recursive and non-recursive procedure resource bounds make use of bounds on the number of loop iterations and recursive procedure call invocations. These bounds are computed using an instrumentation mechanism and an abstract interpretation mechanism according to one or more specified rules. The instrumentation mechanism includes instrumenting one or more counter variables in the source code to count the number of loop iterations or recursive procedure call invocations. The counter variables are initialized to zero according to the specified rule and then may be incremented by 1 or multiplied by 2 also according to the rule being applied. Additionally, the instrumentation mechanism includes the process of making copies $X_0$ of input variables X. This step is required for precise results and is useful if the program modifies X.

The abstract interpretation mechanism includes computing invariants between counter variables and program inputs to obtain bounds on resource utilization of source code, where the program inputs are scalar variables. For this, abstract interpretation is first performed to compute invariants between counter variables and program variables, followed by elimination of all local program variables except copies of program inputs, or those program inputs that do not get modified by the program. The resulting invariants are then used to obtain bounds in terms of the copies of the program inputs, which are then replaced by the corresponding program inputs.

Multiple and varied implementations and embodiments are described below. In the following section, an exemplary environment that is suitable for practicing various implementations is described. After this discussion, representative implementations of systems, devices, and processes for bounding resource consumption for the code using abstract interpretation are described.

Exemplary Architecture

FIG. 1 illustrates an exemplary environment 100 suitable for implementing an embodiment comprising calculation of bounds of resource consumption for code using abstract interpretation. The embodiment described in this section is a general form that applies to a number of specific rule types for calculation of bounds of resource consumption of code. Rule types include, but are not limited to, single counter rule, multiple counter rule, product rule, disequality rule, exponential rule, and logarithmic rule. Examples of embodiments applicable to particular rule types are described in sections that follow.

For discussion purposes, the environment 100 includes a human developer 102, tester 104, and supervisor 106. In other implementations, a computer or other device may automatically perform some or all of the functions performed by the developer 102, tester 104, and supervisor 106.

Typically, the developer 102 writes a set of instructions, also referred to as source code, which when executed demonstrate an expected behavior for the software application. The tester 104, on other hand, tests the software application for its compliance with an expected functionality. Both, the developer 102 and the tester 104 can estimate bounds on different kind of resources consumed by the code. The supervisor 106 can monitor the code and the respective resource bounds to check for code compliance.

The developer 102, the tester 104, and the supervisor 106 communicate with each other through one or more devices 108-1, 108-2, . . . 108-n, collectively referred to as 108, through a network 110.

The device 108 may be implemented as a variety of conventional computing devices including, for example, a server, a desktop PC, a notebook or portable computer, a workstation, a mainframe computer, a mobile computing device, an Internet appliance, a network router, etc. or a combination thereof that are configurable to bound resource consumption for the code based on abstract interpretation.

The network 110 may be a wireless or a wired network, or a combination thereof. The network 110 may be a collection of individual networks interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

In one embodiment, the device 108 includes a processor 112 coupled to a memory 114. The memory 114 includes an instrumentation module 116 and an abstract interpreter 118. The memory 114 may be coupled to or associated with, and/or accessible to other devices, such as network servers, router, and/or other devices 108.

The instrumentation module 116 incorporates one or more counter variables in the code to estimate bounds on the number of loop iterations and recursive procedure call invocations. The instrumentation module 116 initializes the counter variables in the code at appropriate locations in the source code. Further, the instrumentation module 116 instruments an increment to the counter variables at specific locations inside the code. The instrumentation module also creates copies of those program inputs modified inside the code.

The abstract interpreter 118 then computes bounds on the counter variables. To do this, the abstract interpreter first computes invariants between counter variables and program variables. Next, the abstract interpreter eliminates all local program variables except copies of program inputs or program inputs that are not modified by the program. The resulting invariants are then used to obtain bounds in terms of copies of program inputs, which are then replaced by corresponding program inputs.

Figure 2:
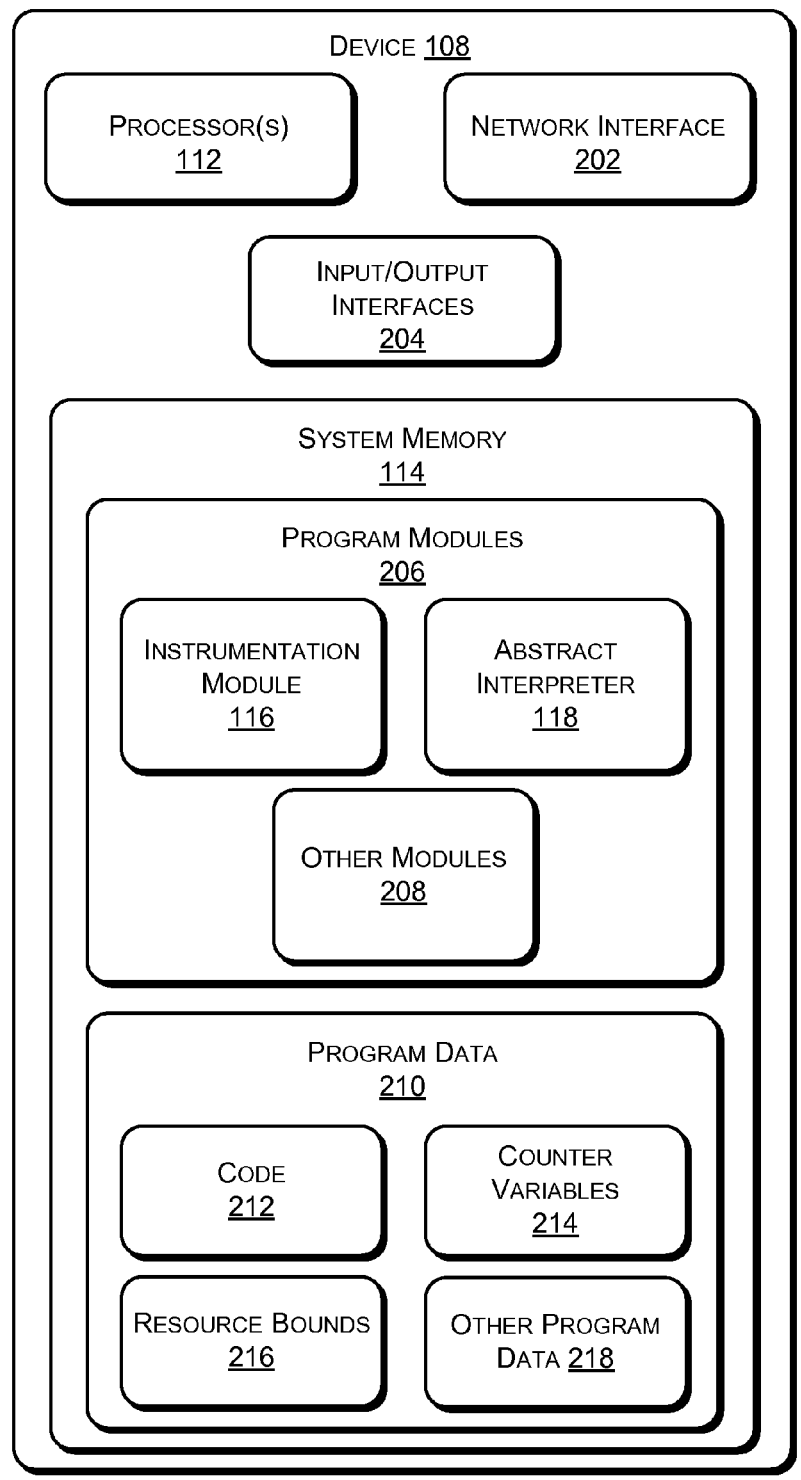
FIG. 2 illustrates an exemplary computing device for implementation of bounding resource consumption using abstract interpretation.

FIG. 2 illustrates various components of an exemplary device 108. In one embodiment, the device 108 can include, but is not limited to, a processor 112, a network interface 202, a system memory 114, and an input/output interface 204.

The network interface 202 may enable the device 108 to receive a software application's code and share the results of the computation of resource bounds over the network 104. For example, the supervisor 106 can monitor both the code and the computation complexity of the code over the network interface 202.

The memory 114 includes a computer-readable media in the form of volatile memory, such as Random Access Memory (RAM) and/or non-volatile memory, such as read only memory (ROM) or flash RAM. The memory 114 typically includes data and/or program modules for implementing calculation of bounds on resource consumption that are immediately accessible to and/or presently operated on by the processor 112. In one embodiment, the memory 114 includes the instrumentation module 116 the abstract interpreter 118, and other modules 208. The other modules 208 may include other software that assists in the functioning of the computing device 108, such as the operating systems. The memory 114 may also include program data 210 that may further include code 212, one or more counter variables 214, one or more resource bounds 216, and other data 218 specific to the system or the applications.

The instrumentation module 116 introduces one or more counter variables 214 in the code 212 to count the number of loop iterations or recursive procedure call invocations during the execution of the code 212. In one implementation, the instrumentation module 116 initializes one or more counter variables 214 at one or more locations in the code 212. The initialization of the counter variables 214 can include setting the value of the counter variable 214 to a start value, such as zero. In one implementation, the instrumentation module 116 then instruments an additive increment to the counter variables 214 at a location specific to a rule applied, as well as creates copies of all program inputs that get modified by the code 212. In another implementation, the instrumentation module 116 instruments a multiplicative increment to the counter variables 214 at a location specific to a rule applied, and then creates copies of all program inputs that get modified by the code 212. In other implementations, the instrumentation module 116 performs other mathematical operations to the counter variables 214 at specified locations prior to creating input variable copies.

Once the counter variables 214 have been instrumented, the abstract interpreter module 118 computes bounds on the number of loop iterations or recursive procedure call invocations by the following process. First, the abstract interpreter 118 computes invariants involving the counter variables 214 at rule specific program locations. Next, the abstract interpreter 118 eliminates all local program variables except copies of program input variables made by the instrumentation module 116 and program input variables that do not get modified by the code 212. The resulting invariants are then used to obtain bounds in terms of the copies of the program input variables, which are subsequently replaced by the corresponding original program input variables.

This section describes an implementation comprising calculation of bounds of resource consumption for code using abstract interpretation wherein a "single counter rule" is applied. The single counter rule is used to compute bounds for program code loops with linear bounds. The single counter rule involves introducing a single counter variable 214 referred to as "i" into the program code 212. The instrumentation module 116 places, and then initializes the counter variable i to 0 at a point in the code 212 prior to the loop, and increments the counter variable i by 1 at a point inside the loop. For example, consider the following loop.

```
while c do
    S;
```

The instrumentation module 116 instruments the above loop as shown below.

```
1.    i := 0;
2.    while c do
3.        i := i + 1;
4.        S;
```

The abstract interpretation module 118 then computes invariants at program point 4, which are used to compute an upper bound u on counter variable i inside the loop. This implies an upper bound of Max(0,u) on the number of loop iterations. Similarly, if the abstract interpreter computes an invariant of the form i≧l outside the loop, then l denotes a lower bound on the number of recursive procedure calls. The lower bounds can help indicate how far the computed lower bounds are from the upper bounds, thereby providing a measure of how much information has been lost in abstraction while trying to compute upper bounds. Lower bounds are also useful in computing general resource bounds (i.e., bounds for resources that unlike time can also be released or decremented).

For example, consider the following code:

```
whileloop (int x, int y, int z)
    while (x + y < z)
    {
        if(*)
            x : = x + 1;
        else
            if(*)
                y : = y + 1;
            else
                z : = z – 1;
    }
```

The instrumentation module 116 instruments a counter variable i in the code 212 example above to count the number of loop iterations. The instrumentation module 116 also creates copies x0,y0,z0 of the input variables x,y,z respectively. The instrumented code may then comprise, for example:

```
1       whileloop (int x, int y, int z)
2           x₀ : = x; y₀ : = y; z₀ : = z
3           i : = 0
4           while (x + y < z)
5           {
6               i : = i + 1;
7               if(*)
8                   x : = x + 1;
9               else
10                  if(*)
12                      y : = y + 1;
13                  else
14                      z : = z – 1;
15          }
```

After the instrumentation module 116 instruments the counter variable i to count the number of loop iterations, the abstract interpreter 118 determines the following invariant at program point 7:

$$I_7: i = 1 + (x-x_0) + (y-y_0) + (z_0-z) \wedge x+y < z. \quad (1)$$

Elimination of the loop-modified variables x,y and z yields the invariant $i \leq z_0-x_0-y_0$, which implies a bound of $z_0-x_0-y_0$ on the counter variable i inside the loop. This in turn implies a bound of Max(0, z-x-y) on the number of loop iterations.

The comparison with zero helps eliminate negative counts of resource utilization and thus helps avoid errors in computation. For example, consider the program code shown in FIG. 3, 302(a), and its instrumented version in FIG. 3, 302(b). The invariant determined at program point 5 would be $i \leq 1+z-x \wedge z<y$, yielding a bound of y-x on the number of iterations of the first loop, if we do not compare with zero. The invariant determined at program point 8 would be $i \leq 1+z-y \wedge z<x$, yielding a bound of x-y on the number of iterations of the second loop, if we do not compare with zero. If these upper bounds are added, the resultant would be (y-x)+(x-y)=0, which is an incorrect estimate of the total combined number of loop iterations of the first and second loop. However, if the single counter rule is used instead, including the comparison with zero, the resultant obtained is Max (0, y-x)+Max (0, x-y)=|x-y|, which is a correct estimate of the total combined number of loop iterations of the first and second loop. This example illustrates the importance of proper application of the single counter rule comprising a comparison with zero, without which, the correct result will not be achieved.

Figure 3:
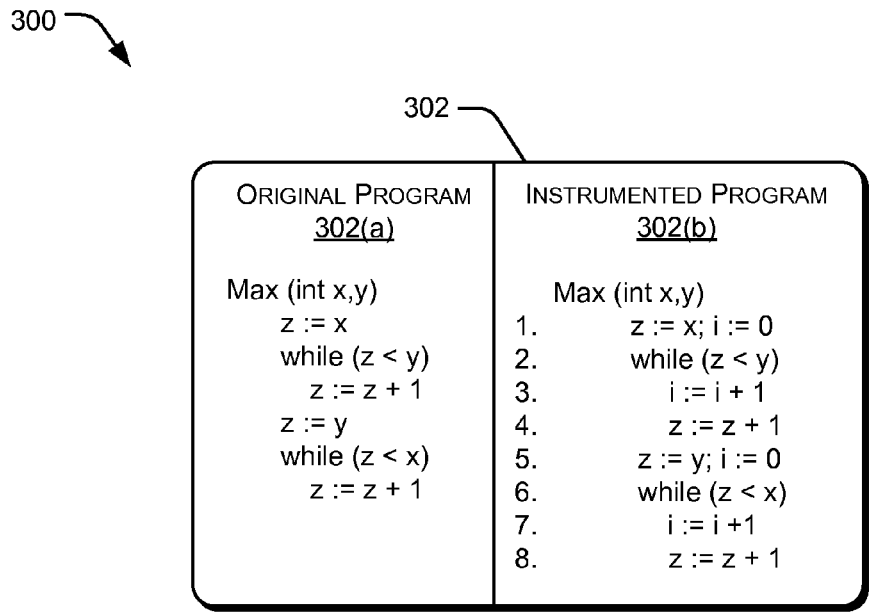
FIG. 3 presents an exemplary instrumentation of source code for bounding resource consumption using a single counter rule.
Figure 3:
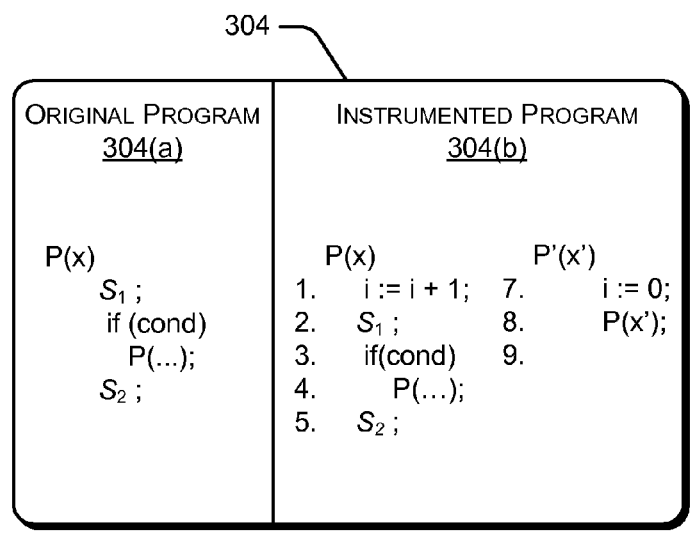

In another implementation, the single counter rule is used to compute bounds on the number of recursive procedure call invocations. FIG. 3 shows an illustration of the single counter rule implemented for a recursive procedure call 304, which includes the original program shown at 304(a) and an instrumented version of the same program shown at 304(b). The instrumentation module 116 initializes the counter variable i in the procedure P' at program point 7. The instrumentation module 116 instrumented an increment of the counter variable in the program P at program location 1. The procedure P' calls the procedure P for the first time after which the program P calls itself recursively until the condition specified is satisfied. The abstract interpreter module 118 computes an upper bound u on the value of the counter variable i at program point 2. An exemplary application of the single counter rule then yields an upper bound of Max (u,0) on the total number of recursive procedure call invocations. Similarly, if the abstract interpreter computes an invariant of the form $i \geq l$ at program point 9, then l denotes a lower bound on the number of recursive procedure call invocations.

Figure 4:
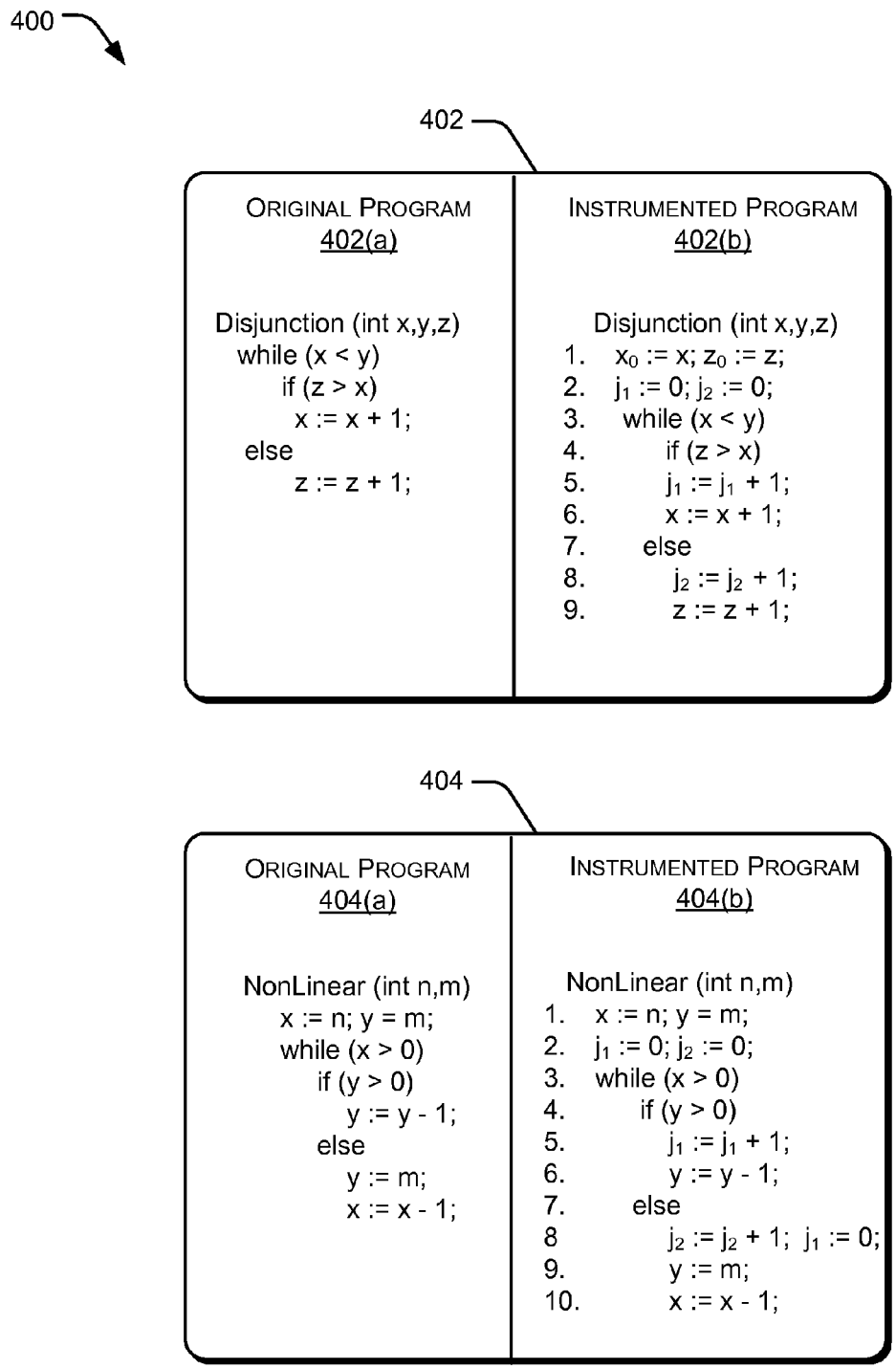
FIG. 4 presents an exemplary instrumentation of source code for bounding resource consumption using a multiple counter rule and a product rule.

This section describes implementations comprising the calculation of bounds of resource consumption for code using abstract interpretation wherein a "multiple counter rule" or a "product rule" is applied. FIG. 4 presents an exemplary instrumentation of source code 400 for bounding resource consumption using the multiple counter rule at 402 and the product rule at 404.

In one implementation, the multiple counter rule may be implemented for source code having disjunctive bounds, as shown in FIG. 4 at 402. Disjunctive bounds may occur in cases where a loop body involves an "if-then-else" statement. The multiple counter rule involves introducing multiple counter variables 214 referred to here as $j_1, \ldots, j_k$ into the program code. The instrumentation module 116 initializes these variables to 0 at points in the code prior to the loop, and increments them by 1 at points inside the loop such that along any path inside the loop at least one of the counter variables gets incremented. The abstract interpretation module then computes invariants, which are used to compute respective upper bounds $u_1, \ldots, u_k$ on these counter variables 214 in terms of variables that do not get modified inside the loop. Then, $\max(0,u_1) + \ldots + \max(0,u_k)$ denotes an upper bound on the number of loop iterations.

The exemplary implementation of the source code 400 shown in FIG. 4 presents an implementation 402 of the multiple counter rule including an original program 402(a) and an instrumented program 402(b). The instrumentation module 116 instruments the counter variables 214 $j_1$ and $j_2$ for the two code paths inside the "while" loop. The abstract interpreter 118 computes invariants at program point 6 as $I_6$: $j_1=1+x-x_0 \wedge x<y$ and at program point 9 as $I_9$: $j_2=1+z-z_0 \wedge z \leq x \wedge x<y$. Existential elimination of loop-modified variables x and z yields upper bounds of $y-x_0$ and $y-z_0$ on counter variables $j_1$ and $j_2$ respectively. This implies an upper bound of Max(0,y-x)+Max(0,y-z) on the total number of loop iterations.

In another implementation, the product rule may be used for source code that has non-linear polynomial bounds, as shown at 404 in FIG. 4. Non-linear polynomial bounds may occur when nested loops are simulated using a simple non-nested loop. The product rule involves introducing two counter variables 214 referred to here as $j_1$ and $j_2$. The instrumentation module 116 initializes the counter variables $j_1$ and $j_2$ to 0 at points in the code prior to the loop and increments them by 1 at points in the code inside the loop such that along any path inside the loop at least one of $j_1$ or $j_2$ gets incremented. Furthermore, the counter variable $j_1$ is initialized to 0 whenever the counter variable $j_2$ is incremented. The abstract interpretation module 118 then computes invariants, which are used by the abstract interpretation module 118 to compute upper bounds $u_1$ and $u_2$ on counters $j_1$ and $j_2$ respectively inside the loop. This implies an upper bound of $\text{Max}(0,u_1)+\text{Max}(0,u_2)+\text{Max}(0,u_1*u_2)$ on the number of loop iterations.

The exemplary implementation of the source code 400 shown in FIG. 4 presents an implementation 404 of the product rule including original program code 404(*a*) and instrumented program code 404(*b*). The instrumentation module 116 instruments increments of the counter variables $j_1$ and $j_2$ at program points 5 and 8, respectively. The instrumentation module 116 also initializes the counter variable $j_1$ to 0 at program point 5. The abstract interpreter 118 calculates the invariants at program point 6 as $I_6$: $j_1=l+m-y \wedge y>0$ and at point 9 as $I_9$: $j_2=l+n-x \wedge x>0$. Existential elimination of loop-modified variables x and y yields the invariants $j_1 \leq m$ and $j_2 \leq n$ at program points 6 and 9 respectively, which implies an upper bound of $\text{Max}(0,m)+\text{Max}(0,n)+\text{Max}(0,n*m)$ on the total number of loop iterations.

Figure 5:
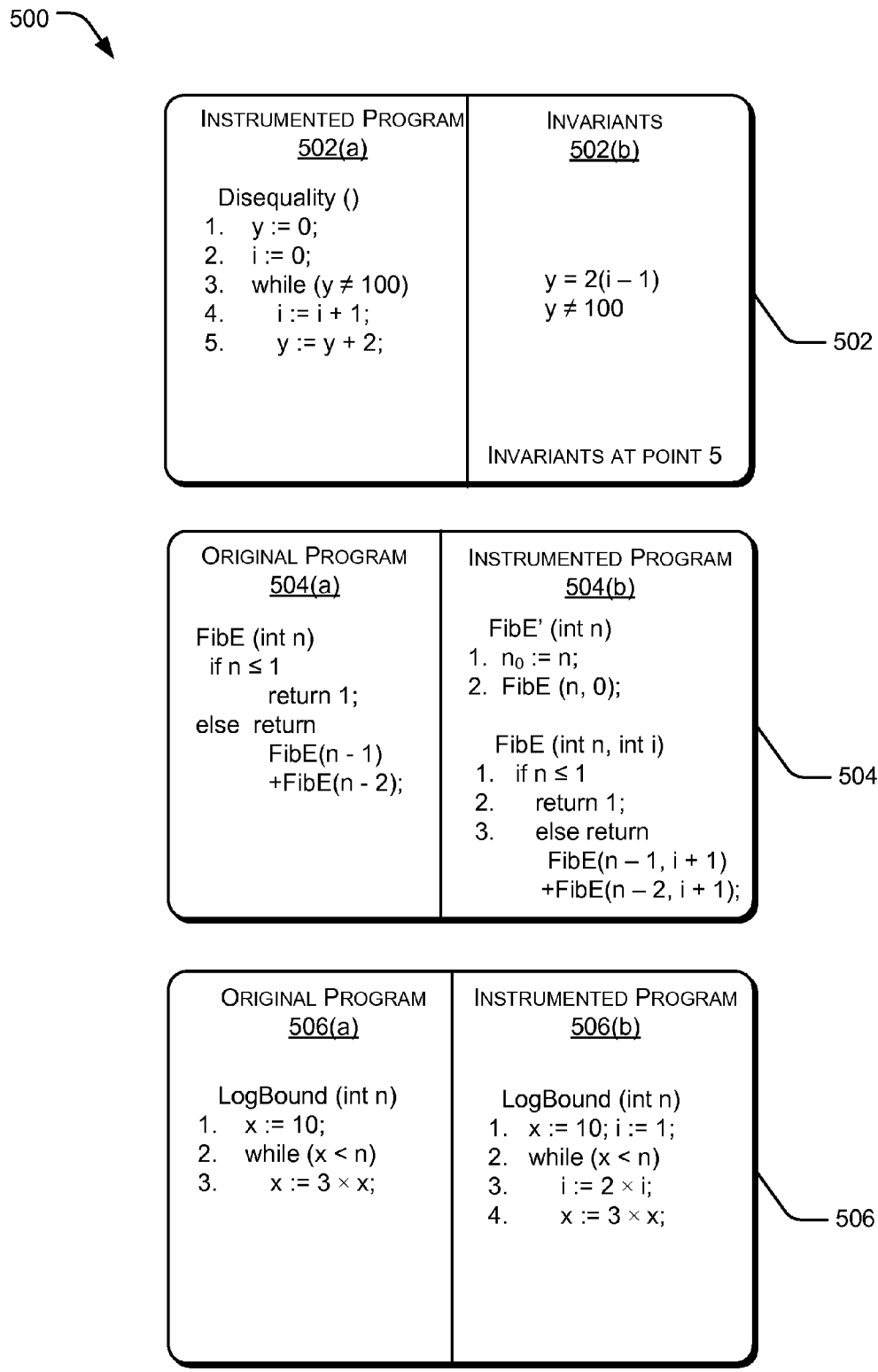
FIG. 5 presents an exemplary instrumentation of source code for bounding resource consumption for loops with disequality control statements, recursive procedures with exponential bounds and loops with logarithmic bounds.

Other implementations are shown in FIG. 5, presenting exemplary source code 500 for bounding the number of loop iterations of loops with disequality guards at 502, for bounding the number of loop iterations of loops with logarithmic bounds at 506, and for bounding the number of recursive procedure call invocations of recursive procedures with exponential bounds at 504.

Loops with a disequality guard $e1 \neq e2$, terminate only when the expression e1 becomes equal to e2. Bounds for such loops with disequality guards can be determined based on the following observation about any counter variable 214, referred to here as "i," instrumented by the instrumentation module 116. If the abstract interpreter 118 deduces an invariant of the form $i \neq e$, where e is some integral expression, then this implies that $i<e$, (i.e. e is an upper bound on the counter variable i). This is because the counter variable is initialized to 0 at a point in the code prior to the loop, and is incremented by 1 in each loop iteration.

The exemplary source code 500 includes source code 502 that further includes statements having disequality guards. The source code 502 includes an instrumented program 502(*a*) and an invariant determination mechanism 502(*b*). The instrumentation module 116 initializes the counter variable i to 0 at program point 2 and instruments an increment to the counter variable i by 1 at program point 4. The abstract interpreter 118 computes the invariant $y=2(i-1) \wedge y \neq 100$. Elimination of loop-modified variable y yields the invariant $i \neq 51$. Since i is initialized to 0 before the loop and i is incremented by 1 every time inside the loop, $i \neq 51$ implies $i<51$, which implies an upper bound of 50 on the number of loop iterations.

The exemplary implementation 500 includes source code 504 that includes recursive procedures with exponential bounds. The recursive procedures are functions that call themselves possibly multiple times and may have non-linear exponential bounds, which may not be directly computed using the single counter rule. An exponential rule may be used to calculate bounds for such recursive procedures. The source code 504 includes original program 504(*a*) and corresponding instrumented program 504(*b*). The procedure FibE calls itself multiple times and has an exponential bound.

In another implementation based on the exponential rule, the instrumentation module 116 introduces the counter variable i as an argument to the recursive procedure. The counter variable may be instrumented to count the number of outstanding recursive procedure calls, i.e., the counter variable bounds the depth of the recursive call stack. The counter variable i is therefore initialized to zero and is incremented by 1 in recursive calls.

In an implementation using the exponential rule, let t be an upper bound on the number of recursive calls to the procedure on any path. For example, the value of t in the instrumented code 504(*b*) would be 2 as the procedure FibE is called two times in the procedure. The abstract interpreter 118 computes an upper bound u on the counter variable i inside the recursive procedure. An upper bound for the number of recursive procedure calls is given by $t^u$.

The exemplary implementation 500 further includes source code 506 for loops with logarithmic bounds. In one implementation, the loops with logarithmic bounds include iterative loops or recursive procedures where the variables in the code are incremented based on a multiplicative factor. For example, the source code 506 includes an instrumented program code 506(*a*). The value of x in the instrumented program code 506(*a*) is multiplied by 3 every time the loop is executed. This leads to the program code having logarithmic bounds.

In a case where the program code has logarithmic bounds, the instrumentation module 116 initializes the counter variable i to 1 in the loop pre-header, as shown in the instrumented program 506(*a*). The instrumentation module 116 instruments an increment of the counter variable i with a multiplicative factor 2 inside the loop. The multiplicative factor 2 for the counter variable i causes the value of the counter variable i to increase exponentially, and thus parallel the behavior of the loop with logarithmic bounds.

An upper bound u may then be computed on the counter variable i using the abstract interpreter 118. This implies an upper bound of log (u) on the total number of loop iterations. For example, in the instrumented program 506(*a*), the abstract interpreter computes the invariant $i \leq 1+x \wedge x<n$ at program point 4. Elimination of loop-modified variable x yields the invariant $i \leq n$, which implies an upper bound of log $(\max(1, n))$ on the number of loop iterations.

Exemplary Methods

Exemplary methods for implementing calculation of resource bounds for code are described with reference to FIGS. 1-5. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations.

Figure 6:
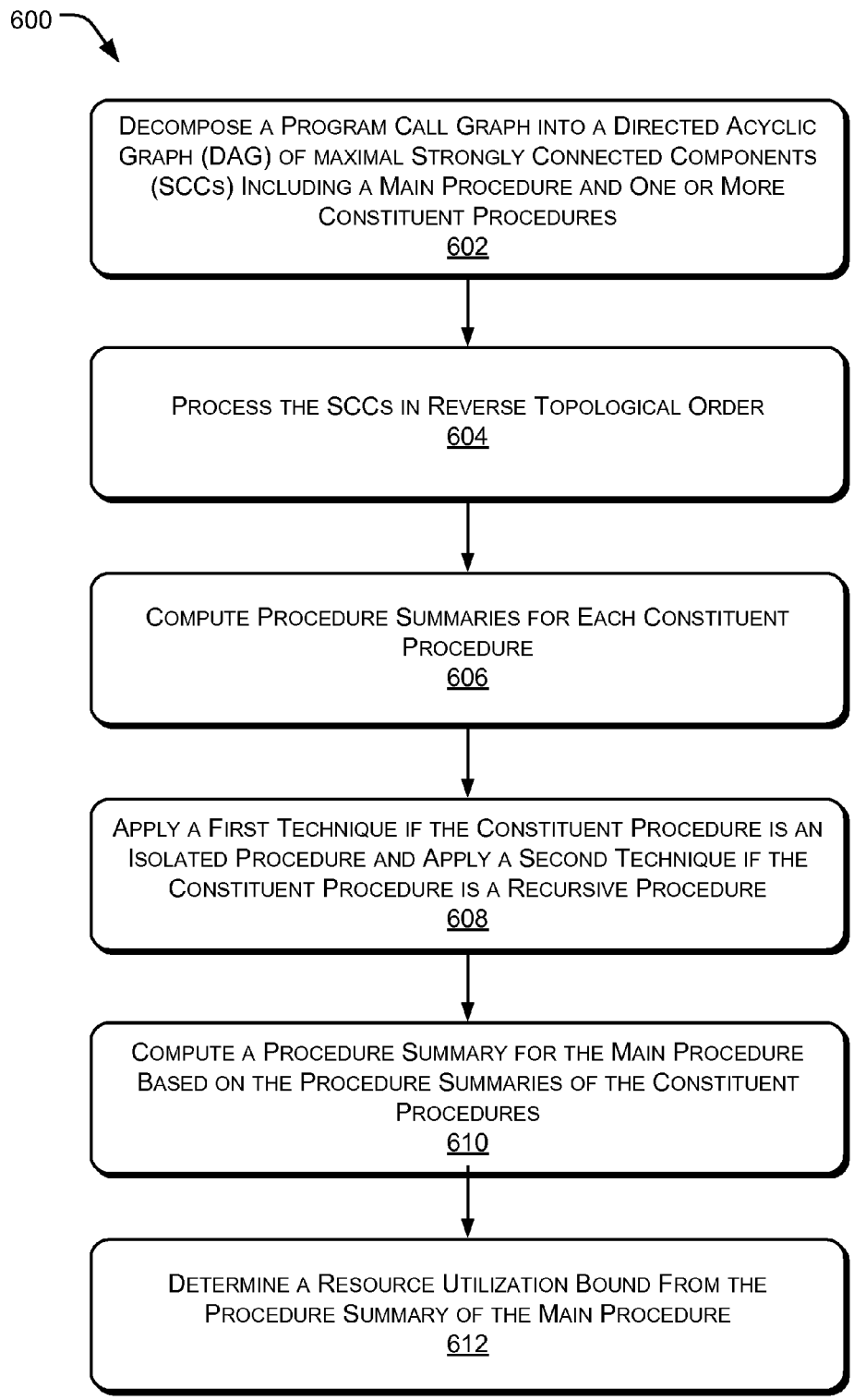
FIG. 6 illustrates exemplary method(s) for calculating resource bounds.

FIG. 6 illustrates an exemplary method 600 of calculating resource bounds for a code based on utilization of resources by the code.

At block 602, a program call graph is decomposed into a Directed Acyclic Graph (DAG) of maximal Strongly Connected Components (SCCs). The SCCs include a main procedure and one or more constituent procedures. At block 604, the SCCs are processed in reverse topological order, which includes computing procedure summaries for each constituent procedure, as shown at block 606. Computing procedure summaries is accomplished by applying a first technique if the constituent procedure is a non-recursive procedure and by applying a second technique if the constituent procedure is a recursive procedure, as shown at block 608. The first and second techniques are described in detail above. At block 610, a procedure summary for the main procedure is computed based on the procedure summaries of the constituent procedures. Then, at block 612, a resource utilization bound for the entire program code is determined from the procedure summary of the main procedure.

Figure 7:
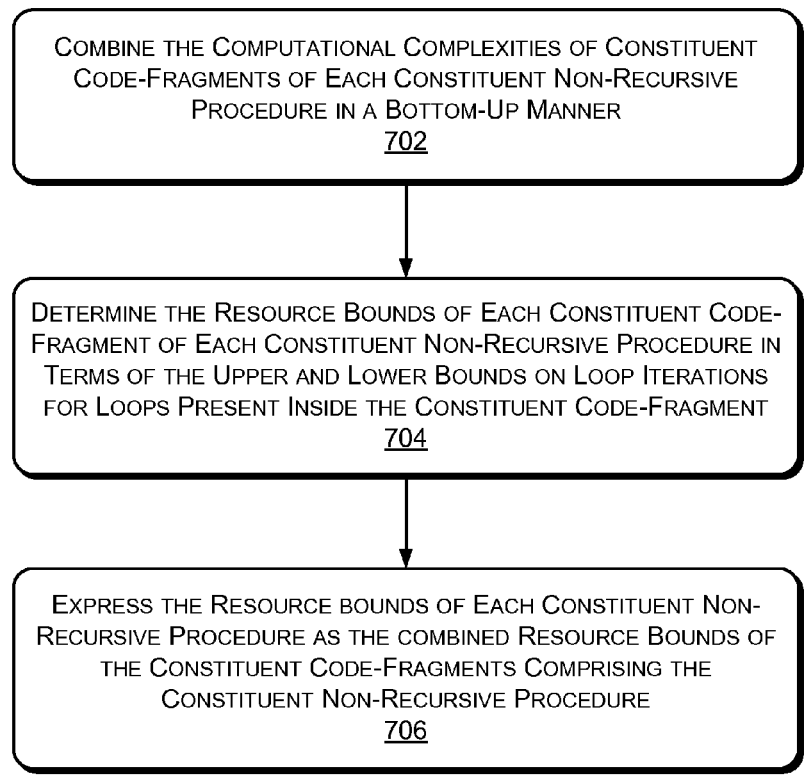
FIG. 7 illustrates exemplary method(s) for computing a procedure summary for a non-recursive program procedure according to a first embodiment.

FIG. 7 illustrates an exemplary method of computing a procedure summary for a program procedure. In one implementation, the procedure summary is computed for constituent non-recursive procedures.

At block 702, the computational complexities of constituent code-fragments of each constituent non-recursive procedure are combined in a bottom-up manner. At block 704, the resource bounds of each constituent code-fragment of each constituent non-recursive procedure are determined, in terms of the upper and lower bounds on loop iterations for loops present inside the constituent code-fragment of each constituent non-recursive procedure. Then, at block 706, the resource bounds of each constituent non-recursive procedure are expressed as combination of the resource bounds of the constituent code-fragments comprising the procedure.

Figure 8:
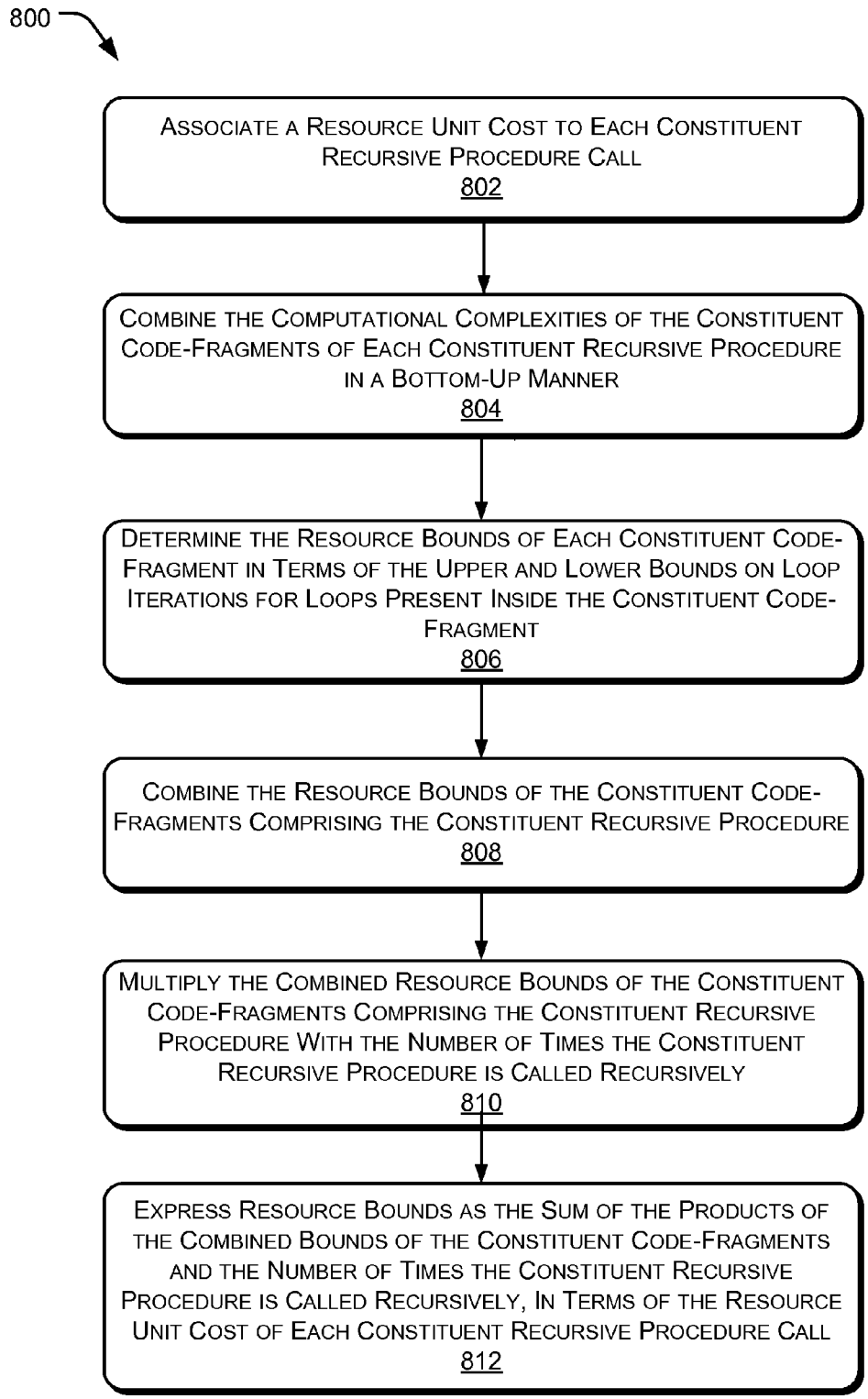
FIG. 8 illustrates exemplary method(s) for computing a procedure summary for a recursive program procedure according to a second embodiment.

FIG. 8 illustrates another exemplary method of computing a procedure summary for a program procedure. In the implementation described, the procedure summary is computed for a recursive procedure.

At block 802, a resource unit cost is associated with each constituent recursive procedure transitively called by a recursive procedure This resource unit cost represents the cost of one constituent recursive procedure call relative to a system resource, such as memory consumption for example. At block 804, the computational complexities of constituent code-fragments of each constituent recursive procedure are combined in a bottom-up manner. At block 806, the resource bounds of each constituent code-fragment of each constituent recursive procedure are determined, in terms of the upper and lower bounds on loop iterations for loops present inside the constituent code-fragment of each constituent recursive procedure.

At block 808, the resource bounds of the constituent code-fragments comprising the constituent recursive procedure are combined. At block 810, the combined resource bounds of the constituent code-fragments comprising each constituent recursive procedure are multiplied by the number of times the constituent recursive procedure is called recursively. Then, at block 812, the resource bound of the recursive procedure under consideration is expressed as the sum of the products of the combined resource bounds of the collective constituent code-fragments comprising each constituent recursive procedure and the number of times the constituent recursive procedure is called recursively. The resource bounds are expressed in terms of the associated resource unit cost of each constituent recursive procedure call.

Figure 9:
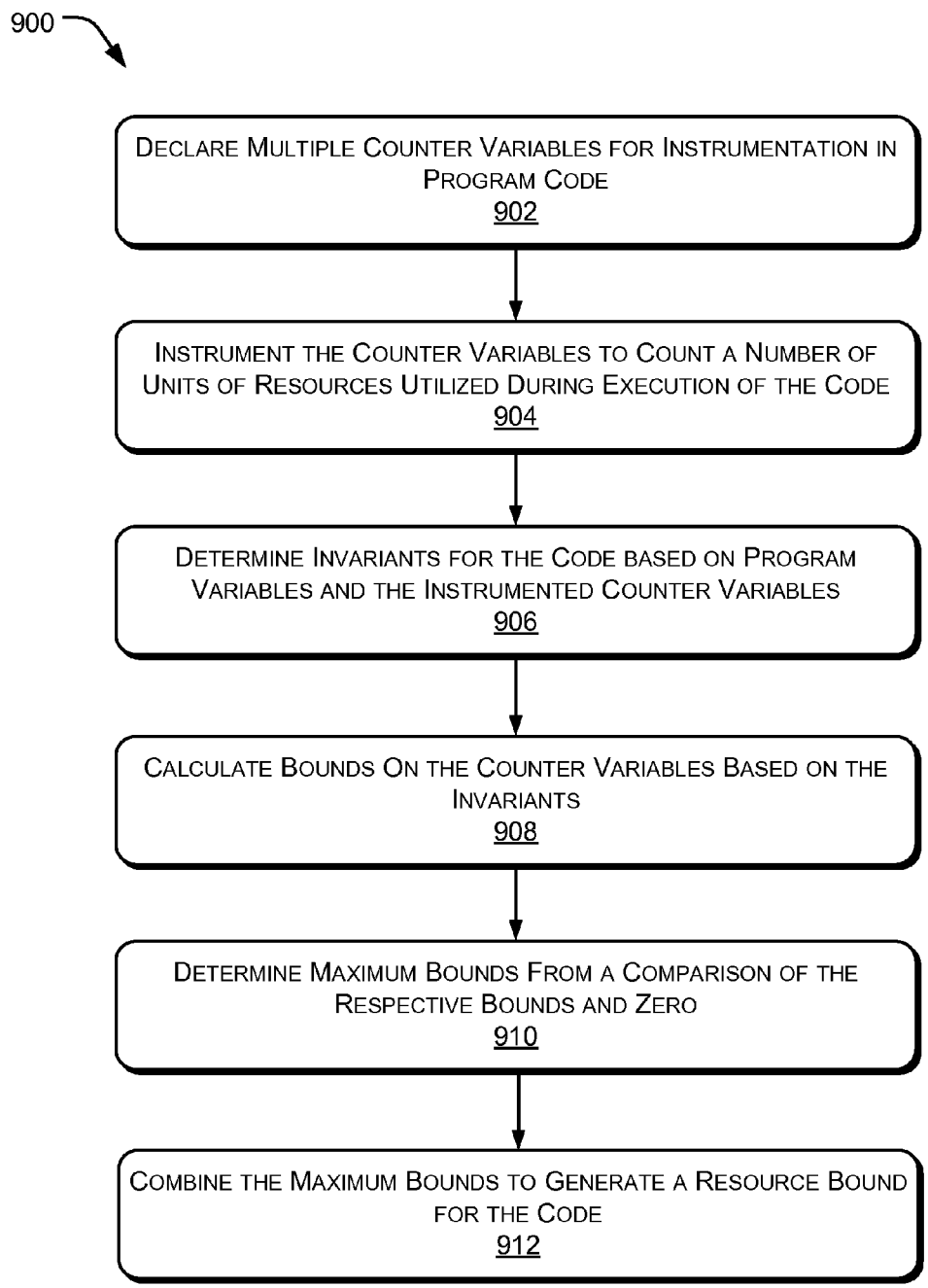
FIG. 9 illustrates exemplary method(s) for calculating resource bounds according to an embodiment using a comparison of calculated bounds with zero.

FIG. 9 illustrates another exemplary method for calculating resource bounds by combining bounds of one or more parts of code.

At block 902, multiple counter variables are declared for instrumentation in the program code by the instrumentation module 116. Declaring one or more counter variables can include counting usage of resources during execution of one or more parts of the code. At block 904, the instrumentation module 116 instruments the counter variables to count the number of resources utilized during execution of the code.

At block 906, the abstract interpreter 118 determines invariants for one or more parts in the code based on the counter variables and program input variables. In one implementation, the invariants are expressed as an expression of one or more variables in the code, the value of which does not change based on the execution of the code.

At block 908, the abstract interpreter 118 calculates bounds for the code based on the invariants. At block 910, the abstract interpreter 118 determines maximum bounds based on a comparison of the respective bounds and zero.

At block 912, the abstract interpreter 118 combines the maximum bounds for the code to generate the resource bound for the entire program code. The bounds are combined according to a specific counter rule selected. For example, one or more maximum part bounds can be added together to generate the resource bound for the code.

Figure 10:
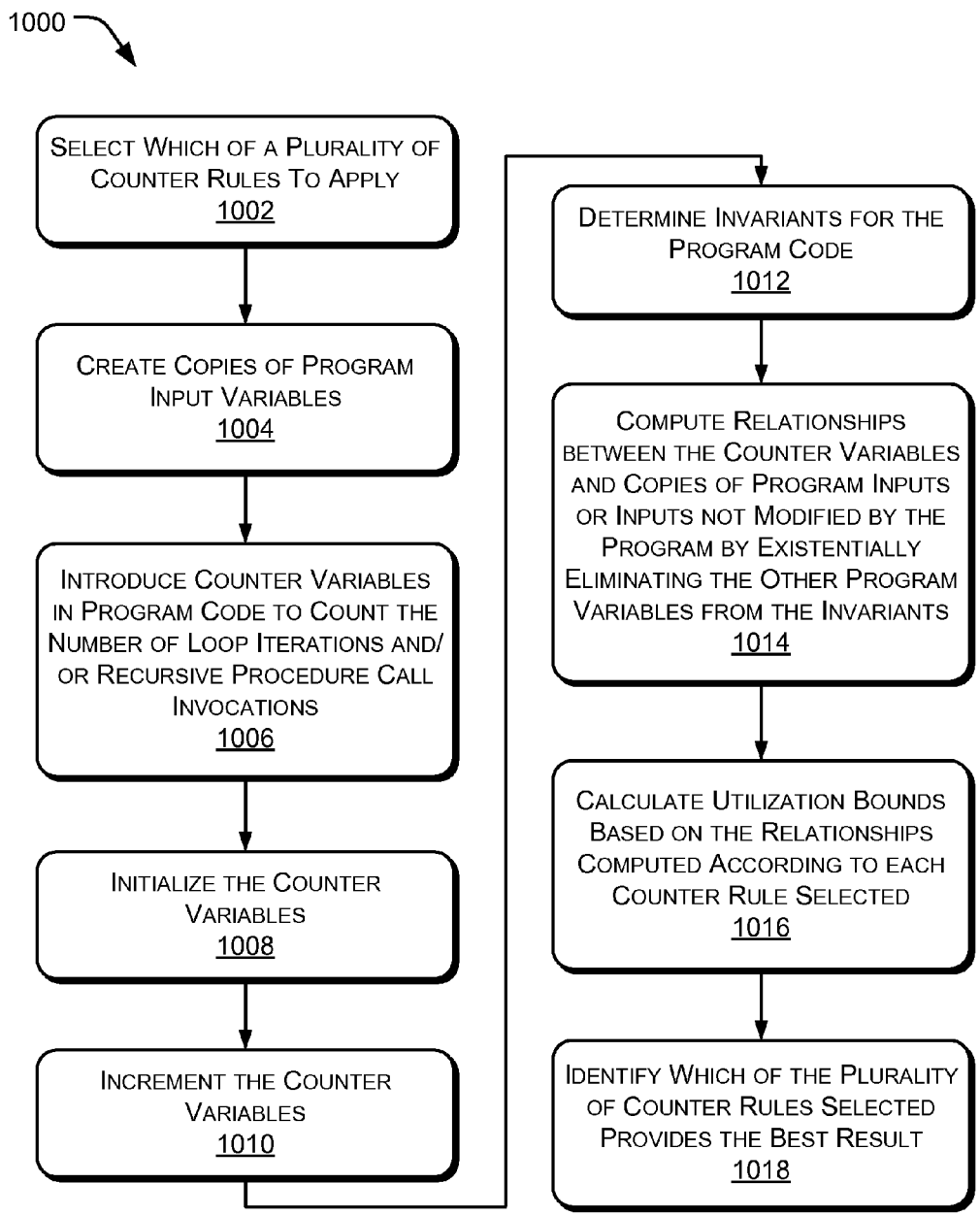
FIG. 10 illustrates exemplary method(s) for calculating resource bounds by selecting which of a plurality of counter rules to apply.

FIG. 10 illustrates another exemplary method of calculating resource bounds, including identifying which of a plurality of counter rules to apply. For example, rules that may be selected include a single counter rule, a multiple counter rule, a product rule, a disequality rule, an exponential rule, a logarithmic rule, or other counter rules. The procedure described may be applied for calculating resource bounds using any number of counter rules, in any order, or all counter rules applied successively.

At block 1002, a number of counter rules is selected for individual and/or successive application to compute resource utilization bounds of program code. At block 1004, the instrumentation module 116 creates copies of the program input variables. At block 1006, the instrumentation module 116 introduces one or more counter variables into the program code, to count the number of loop iterations and/or recursive procedure call invocations made by the code. At block 1008, the instrumentation module 116 initializes the counter variables, and at block 1010, the instrumentation module 116 increments the counter variables according to the current rule being applied.

At block 1012, the abstract interpreter 118 determines invariants for one or more parts of the code based on the counter variables and program variables. At block 1014, the abstract interpreter 118 computes relationships between counter variables and copies of program inputs or inputs that are not modified by the program by existentially eliminating all other program variables from the invariants.

At block 1016, abstract interpreter 118 calculates respective utilization bounds on the counter variables based on the relationships between counter variables and program inputs, according to each of the rule strategies applied. At block 1018, the results of applying each of the rule strategies is examined, and the rule providing the best result is accepted as the resource bound for the entire program code. In one embodiment, the rule providing the best result is the rule providing the result with a minimum value.

Any of the acts of any of the methods described herein may be implemented at least partially by a processor or other electronic device based on instructions stored on one or more computer-readable media. Computer-readable media can be any available media that can be accessed during computation of resource bounds. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Combinations of any of the above should also be included within the scope of computer-readable media.

Conclusion

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method of statically computing a bound on a resource utilized during execution of code, the method comprising:

decomposing a program call graph into a directed acyclic graph (DAG) of maximal strongly connected components (SCCs), wherein the SCCs include a main procedure and one or more constituent procedures;

processing the SCCs in reverse topological order, including computing procedure summaries for each constituent procedure by applying a first technique if the constituent procedure is a non-recursive procedure and applying a second technique if the constituent procedure is a recursive procedure, wherein the second technique comprises:

associating a resource unit cost to each constituent recursive procedure called transitively by the recursive procedure under consideration;

combining a computational complexity of constituent code-fragments of each constituent recursive procedure in a bottom-up manner;

determining the resource bounds of each constituent code-fragment of each constituent recursive procedure in terms of upper and lower bounds on loop iterations for loops present inside the constituent code-fragment of the constituent recursive procedure;

computing a procedure summary for the main procedure based on the procedure summaries of the constituent procedures; and determining a resource utilization bound from the procedure summary of the main procedure.

2. The method of claim 1, wherein the first technique for computing a procedure summary for a constituent non-recursive procedure comprises:

combining a computational complexity of constituent code-fragments of each constituent non-recursive procedure in a bottom-up manner;

determining resource bounds of each constituent code-fragment of each constituent non-recursive procedure in terms of upper and lower bounds on loop iterations for loops present inside the constituent code-fragment of each constituent non-recursive procedure; and expressing the resource bounds of each constituent non-recursive procedure as the combined resource bounds of the constituent code-fragments comprising the constituent non-recursive procedure.

3. The method of claim 1, wherein the second technique for computing a procedure summary for a constituent recursive procedure further comprises:

combining the resource bounds of the constituent code-fragments comprising the recursive procedure;

multiplying the combined resource bounds of the constituent code-fragments comprising the recursive procedure with the number of times the constituent recursive procedure is called recursively; and expressing the resource bounds of the recursive procedure under consideration as the sum of the products of the combined resource bounds of the collective constituent code-fragments comprising the constituent recursive procedure and the number of times the constituent recursive procedure is called recursively, in terms of the associated resource unit cost of each constituent recursive procedure call.

4. The method of claim 1, wherein a resource utilization bound may be computed for one of the following resources:

memory consumption, number of files opened, number of threads created, number of file handles or locks, or the amount of available network bandwidth used.

5. A method of statically computing a bound on the number of loop iterations or recursive procedure call invocations, the method comprising:

instrumenting multiple counter variables in program code to count the number of units of resources utilized during execution of the code;

determining invariants for the code based on program variables and the instrumented counter variables;

existentially eliminating all program variables except counter variables and program inputs from the invariants;

calculating respective bounds on the counter variables based on the invariants; and combining the respective bounds on the counter variables to generate the resource bound.

6. The method of claim 5, wherein combining the respective bounds on the counter variables comprises:

determining maximum bounds from a comparison of each of the respective bounds and zero; and combining the maximum bounds.

7. The method of claim 6, wherein combining the maximum bounds comprises: adding the maximum bounds; and determining the resource bound based on a comparison of the added maximum bounds and zero.

8. The method of claim 6, wherein combining the maximum bounds comprises:

multiplying the maximum bounds; and determining the resource bound based on a comparison of the multiplied maximum bounds and zero.

9. The method of claim 5, wherein calculating the respective bounds comprises computing resource bounds for a timing resource for iterative loops and recursive procedures, and wherein the counts of the counter variables are based on the number of loop iterations and the number of recursive procedure calls in the code.

10. The method of claim 5, wherein instrumenting multiple counter variables comprises:

initializing one or more counter variables in the code; and instrumenting iterative loops and recursive procedures with an increment of the counts of the counter variables based on the number of units of resources utilized during execution of the iterative loops and the recursive procedures.

11. The method of claim 10, further comprising:

computing upper bounds on the counter variables; and identifying respective bounds for the iterative loops and the recursive procedures based on a comparison of the upper bounds.

12. The method of claim 10, further comprising:

computing upper bounds on the counter variables based on invariants for the iterative loops and translating a disequality relationship involving counter variables into an inequality relationship; and identifying the respective bounds for the iterative loops and the recursive procedures based on a comparison of the upper bounds.

13. The method of claim 10, further comprising:
incrementing a count of the number of recursive calls to the procedures; computing upper bounds for the recursive procedures based on invariants for the recursive procedure, wherein the counts of the counter variables are based on the depth of the recursive call stack; and
identifying the respective bounds for the recursive procedures based on a comparison of the upper bounds.

14. The method of claim 10, further comprising:
computing upper bounds on the counter variables at locations in the iterative loops based on invariants for the iterative loops and the counts of the counter variables, wherein the counts of the counter variables are incremented multiplicatively for the iterative loops with logarithmic code complexity; and
identifying the respective bounds for the iterative loops based on a comparison of the upper bounds.

15. A system comprising:
memory;
one or more processors operatively coupled to the memory;
an instrumentation module configured to:
create copies of program input variables, introduce one or more counter variables in program code to count the number of loop iterations and/or recursive procedure call invocations, initialize the counter variables, increment the counter variables; and
an abstract interpreter configured to:
determine invariants for the program code involving both the counter variables and program variables, existentially eliminate all program variables except counter variables and program inputs from the invariants, and compute respective utilization bounds on the counter variables based on the invariants in terms of program input variables, according to a rule strategy.

16. The system recited in claim 15, wherein existentially eliminating program variables from the invariants comprises:
eliminating variables other than the copies of program variables made by the instrumentation module, the counter variables introduced by the instrumentation module, and the program input variables not modified by the program code.

17. The system recited in claim 15, wherein computing respective utilization bounds comprises:
selecting which of a plurality of counter rules to apply;
calculating respective utilization bounds on the counter variables based on the invariants in terms of the program input variables, according to each counter rule selected; and
identifying which of the plurality of counter rules selected provides the best result.

18. The system recited in claim 17, wherein identifying which of the plurality of counter rules selected comprises identifying which of the plurality of counter rules selected provides a result with a minimum value.

19. The system recited in claim 17, wherein selecting which of a plurality of counter rules to apply comprises selecting a single counter rule, a multiple counter rule, a product rule, a disequality rule, an exponential rule, or a logarithmic rule.

20. The system recited in claim 17, wherein determining which of a plurality of counter rules to apply comprises selecting a single counter rule, a multiple counter rule, a product rule, a disequality rule, an exponential rule, and a logarithmic rule.

* * * * *